United States Patent [19]

Yang

[11] Patent Number: 5,929,929
[45] Date of Patent: Jul. 27, 1999

[54] METHOD FOR REMOVING BACKGROUND NOISE DURING RECEPTION OF WEAK ELECTRIC FIELD SIGNALS

[75] Inventor: Jae Mo Yang, Suwon, Rep. of Korea

[73] Assignee: Samsung Electronics Co., Ltd., Suwon, Rep. of Korea

[21] Appl. No.: 08/941,183

[22] Filed: Sep. 30, 1997

[30] Foreign Application Priority Data

Dec. 6, 1996 [KR] Rep. of Korea .................. 96-62516

[51] Int. Cl.⁶ ................................................ H04N 5/45
[52] U.S. Cl. .................................... 348/565; 455/310
[58] Field of Search .................................. 348/565, 563, 348/564, 569, 566, 570, 731, 633, 634, 635; 455/132, 140, 142, 310, 311, 312; H04N 5/445, 5/45, 5/50

[56] References Cited

U.S. PATENT DOCUMENTS

| | | | |
|---|---|---|---|
| 4,959,719 | 9/1990 | Strubbe et al. | 358/183 |
| 4,967,275 | 10/1990 | Vogel | 358/183 |
| 5,436,675 | 7/1995 | Hayashi et al. | 348/725 |
| 5,604,928 | 2/1997 | Hamano et al. | 455/310 |
| 5,671,019 | 9/1997 | Isoe et al. | 348/565 |
| 5,715,014 | 2/1998 | Perkins et al. | 348/565 |
| 5,757,441 | 5/1998 | Lee et al. | 348/731 |

*Primary Examiner*—Andrew I. Faile
*Assistant Examiner*—Uyen Le
*Attorney, Agent, or Firm*—Dilworth & Barrese

[57] ABSTRACT

A method for removing the background noise during reception of weak electric field intensity signals. If the electric field intensity of television broadcast signals received by a main picture receiving section is weak, a PIP (picture in picture) function is released, and the release is displayed to notify it to the user. The electric field intensity of the received television broadcast signals is determined in accordance with the AGC signals of the television broadcast signals which are received by a main picture receiving section. If the electric field intensity is strong, the amplification gain of an LNA is adjusted to a low level, and a PIP function is executed or released, depending upon the user's selection of the PIP function. If the electric field intensity is weak, the amplification gain of an LNA is adjusted to a high level, and a determination is made as to whether the PIP function is being executed. If the PIP function is being executed, the PIP function is released, and the release is displayed in the form of an OSD (on screen display) to notify the release to the user. Therefore, in the present invention, when the electric field intensity of the television broadcast signals of the main picture receiving section is weak, the PIP picture receiving section is disabled, so that the PIP picture receiving section would not generate the spurious radiation, thereby upgrading the picture quality on the screen.

5 Claims, 3 Drawing Sheets

METHOD FOR REMOVING BACKGROUND NOISE DURING RECEPTION OF WEAK ELECTRIC FIELD SIGNALS

BACKGROUND OF THE INVENTION

1. Field of the Invention

The present invention relates to an image having a PIP (picture in picture) function. Particularly, the present invention relates to a method for removing background noises during the reception of weak electric field signals, in which the background noises (which are generated when the intensity of the electric field of a television broadcast signal is weak) can be reduced.

2. Description of the Related Art

Generally, an image receiver such as a television receiver or a video cassette tape recorder with a PIP function includes a main picture receiving section and a PIP picture receiving section which receive television broadcast signals.

The television broadcast signals which are received by the main picture receiving section and the PIP picture receiving section are mixed together at a PIP section, and then displayed on a screen of a cathode ray tube.

Specifically, the image of the television broadcast signals which has been received by the main picture receiving section is displayed on the whole screen, whereas the image of the television broadcast signals which has been received by the PIP picture receiving section is displayed in the form of a PIP picture on a part of the main picture.

In an image receiver with a PIP function, if the electric field intensity of the television broadcast signals is weak thereby generating background noise, the conventional method of reducing background noise is effected by adjusting the gains of the television broadcast signals that are received through an antenna.

Specifically, the PIP picture receiving section receives the television broadcast signals which have been gain-adjusted in accordance with the electric field intensity of the television broadcast signals which are received by the main picture receiving section.

FIG. 1 is a signal flow chart showing the conventional method for removing the background noise.

As shown in FIG. 1, at step S1, a determination is made as to the electric field intensity of the television broadcast signals which are received by a main picture receiving section.

If the electric field intensity which is determined at step S1 is strong, then at step S2, an LNA (low noise amplifier) is controlled to amplify the reception signals of an antenna so as to adjust the gain to a low level. On the other hand, if electric field intensity is weak, then at step S3, the gain of the LNA is adjusted to a high level.

When the adjustment of the gain of the LNA is completed, a determination is made at step S4 as to whether the user selects a PIP function. If the PIP function is selected, then at step S5, a PIP picture receiving section is activated, and the PIP function is executed. On the other hand, if the PIP function is not selected at step S4, then the PIP function is released at step S6.

Generally, when television broadcast signals are received, a local oscillator operates to convert the received television broadcast signals to intermediate frequency signals. During operation, however, the local oscillator radiates oscillation signals to the outside in the form of "spurious radiation". This spurious radiation not only affects the image receiver, but also affects other nearby electronic apparatuses.

When the PIP function is selected, both the main picture receiving section and the PIP picture receiving section have to be activated. However, when the PIP function is not selected, it is desirable to not have the PIP picture receiving section activated, so as to prevent the generation of spurious radiation.

Further, when the electric field intensity of the received television broadcast signals is low, the spurious radiation from the PIP picture receiving section affects the television broadcast signals which are received by the main picture receiving section.

In the conventional television receiver with a PIP function, if the user selects the PIP function, then power is supplied to the PIP picture receiving section to activate it regardless of the electric field intensity of the received television broadcast signals so as to execute the PIP function.

Therefore, when the electric field intensity of the television broadcast signals which are received by the main picture receiving section is weak, if the PIP function is selected, video signals that are received by the main picture receiving section are affected by the spurious radiation from the PIP picture receiving section. Consequently, background noises are generated, which results in aggravating the quality of the main picture.

SUMMARY OF THE INVENTION

The present invention is intended to overcome the above described disadvantages of the conventional method.

It therefore is an object of the present invention to provide a method for removing the background noise during the reception of weak electric field intensity signals, in which the PIP function is released if the electric field intensity of the television broadcast signals received by the main picture receiving section is weak.

It is another object of the present invention to provide a method for removing the background noise during reception of weak electric field intensity signals, whereby the PIP function is released upon the encountering of a weak electric field intensity of television broadcast signals, and a message is displayed in the form of an OSD (on screen display) to notify the user of the release.

In achieving the above objects, one aspect of the present invention is characterized as follows. The electric field intensity of the received television broadcast signals is determined based on the level of the electric field intensity in accordance with the AGC (automatic gain control) signals of the television broadcast signals which are received by a main picture receiving section.

If the electric field intensity is strong, the amplification gain of an LNA is adjusted to a low level, and a PIP function is executed or released in accordance with the selection of the PIP function.

If the electric field intensity is weak, the amplification gain of an LNA is adjusted to a high level, and a determination is made as to whether the PIP function is being executed. If the PIP function is being executed, the PIP function is released, and the release is displayed in the form of an OSD to notify the release to the user.

Therefore, when the electric field intensity of the television broadcast signals of the main picture receiving section is weak, the PIP picture receiving section is disabled to prevent the PIP picture receiving section from generating the spurious radiation, thereby upgrading the picture quality on the screen.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENTS

The method for removing background noises during reception of weak electric field signals according to the present invention will be described in detail with reference to FIGS. 2 and 3.

Figure 1:
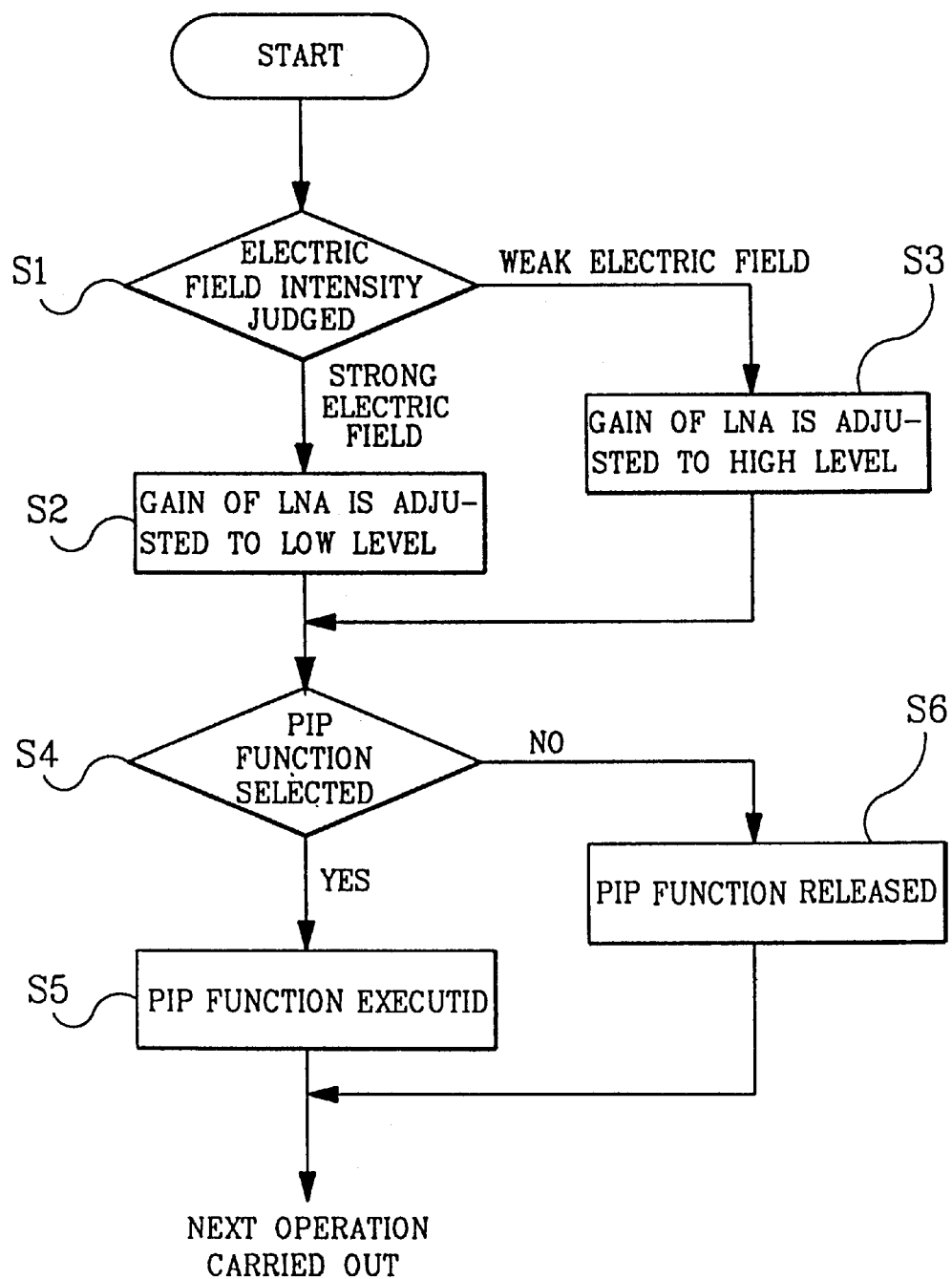
FIG. 1 is a signal flow chart showing the conventional method for removing the background noise.
Figure 2:
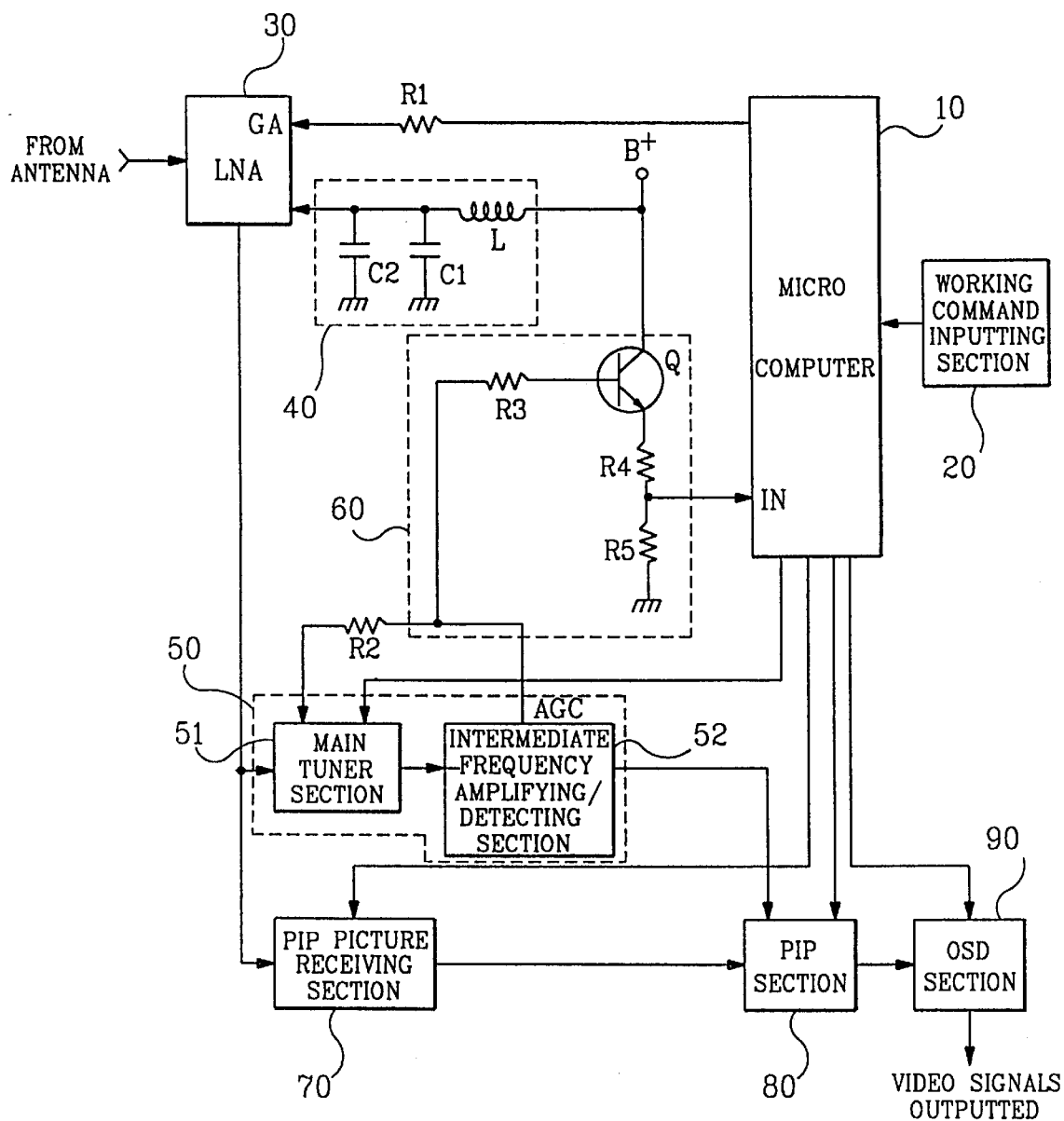
FIG. 2 is a circuital illustration showing the elements of the image receiver to which the background noise removing method according to the present invention is applied.

FIG. 2 is a circuital illustration showing the elements of the image receiver to which the background noise removing method according to the present invention is applied.

In this drawing, reference code 10 indicates a microcomputer, and 20 indicates a working command inputting section.

The microcomputer 10 adjusts the gain of the received television broadcast signals in accordance with the electric field intensity of the television broadcast signals of a main picture receiving section. Further, the microcomputer 10 controls the reception of the television broadcast signals in accordance with the working commands of the working command inputting section 20. The microcomputer 10 also controls the execution of the PIP function.

Reference code 30 indicates an LNA for amplifying the television broadcast signals received through an antenna. The LNA 30 includes a gain adjustment terminal GA, and adjusts the gain of the television broadcast signals from the antenna in accordance with the levels of the gain-controlled signals which are supplied from the microcomputer 10 to the gain adjustment terminal GA.

Reference code 40 indicates a power supply section for stabilizing a power source B+ to supply it to the LNA 30. The power supply section 40 is designed such that the power source B+ is supplied through a coil L and ground capacitors C1 and C2 to a power terminal of the LNA 3.

Reference code 50 indicates a main picture receiving section, which receives the television broadcast signals of a relevant channel under the control of the microcomputer 10, and outputs such signals to main picture video signals.

The main picture receiving section 50 includes: a tuner section 51 which receives the television signals of the relevant channel from the output signals of the LNA 30 under the control of the microcomputer 10, and which adjusts the gain of the television broadcast signals received in accordance with AGC signals; and an intermediate frequency amplifying/detecting section 52 which amplifies and detects the intermediate frequency signals of the tuner section 51 to output main picture video signals and to output AGC signals.

Reference code 60 is an electric field intensity detecting section which detects the electric field intensity based on the AGC signals of the intermediate frequency amplifying/detecting section 52 and outputs the detected results to the microcomputer 10.

The electric field intensity detecting section 60 includes a transistor Q, and the AGC signals flow through a resistor R3 to the base of the transistor Q. Further, the power source B+ is connected to the collector of the transistor Q, and the emitter of the transistor Q is connected through a resistor R4 to an input terminal IN of the microcomputer 10. The emitter of transistor Q is also connected through the resistor R4 and a resistor R5 to the ground.

Reference code 70 indicates a PIP picture receiving section which receives the television broadcast signals of the relevant channel under the control of the microcomputer 10 and outputs PIP picture video signals.

Reference code 80 indicates a PIP section which inserts the PIP picture video signals of the PIP picture receiving section 70 into the video signals of the main picture of the main picture receiving section 50 under the control of the microcomputer 10.

Reference code 90 indicates an OSD section which inserts OSD characters into the output signals of the PIP section 80 under the control of the microcomputer 10.

In the image receiver described above, the power source B+ is stabilized by the coil L and the grounding capacitors C1 and C2 of the power supply section 40. The power source B+ is supplied as an operating power to the LNA 30.

The television broadcast signals from the antenna are amplified by the LNA 30, and are then transmitted to both the main picture receiving section 50 and the PIP picture receiving section 70.

In this instance, if the user selects a channel by using a key switch or a remote controller, the working command inputting section 20 sends a channel selection signal to the microcomputer 10.

The microcomputer 10 controls the tuner selection 51 of the main picture receiving section 50, so that the television broadcast signals of the selected channel can be received.

The television broadcast signals which have been inputted into the tuner section 51 of the main picture receiving section 50 are outputted as intermediate frequency signals which are intermediately amplified by the intermediate frequency amplifying/detecting section 52. After the amplification, they are outputted as main picture video signals. Further, the intermediate frequency amplifying/detecting section 52 outputs AGC signals based on the levels of the intermediate frequency signals of the tuner section 51.

The main picture video signals from the intermediate frequency amplifying/detecting section 52 are transmitted through the PIP section 80 and the OSD section 90 to be displayed on a screen.

The AGC signals which are outputted from the intermediate frequency amplifying/detection section 52 are transmitted through the resistor R2 to the tuner section 51. The tuner section 51 adjusts the gain of the received television broadcast signals in accordance with the AGC signals.

The AGC signals generated from the intermediate frequency amplifying/detecting section 52 are transmitted through the resistor R3 of the electric field intensity detecting section 60 to the base of the transistor Q.

Bias voltages are supplied to the base of the transistor Q in accordance with the AGC signals, so that electric currents would flow through its emitter in accordance with the AGC signals. The electric currents of the emitter create voltage drops across the resistor R5 which are inputted into the terminal IN of the microcomputer 10.

Based on the voltage signals which are inputted into the terminal IN, the microcomputer 10 determines the electric field intensity of the television broadcast signals which are received by the main picture receiving section 50. Based on the result of that determination, gain control signals are outputted to the gain control adjustment terminal GA of the LNA 30, thereby adjusting the gain of the television broadcast signals.

In this instance, the user manipulates the key switch or the remote controller to select the PIP function. Thus, if the PIP picture receiving section 70 selects a channel, the working command inputting section 20 supplies PIP function selection signals and channel selection signals to the microcomputer 10.

Then the microcomputer 10 controls the PIP picture receiving section 70, so that the signals selected by the user can be received, and video signals can be generated. Further, the microcomputer 10 controls the PIP section 80 to insert the PIP picture video signals of the PIP picture receiving section 80 into the main picture video signals of the intermediate frequency amplifying/detecting section 52. The merged signals are then outputted through the OSD section 90, with the result that the main picture and the PIP picture are simultaneously displayed on the screen.

Figure 3:
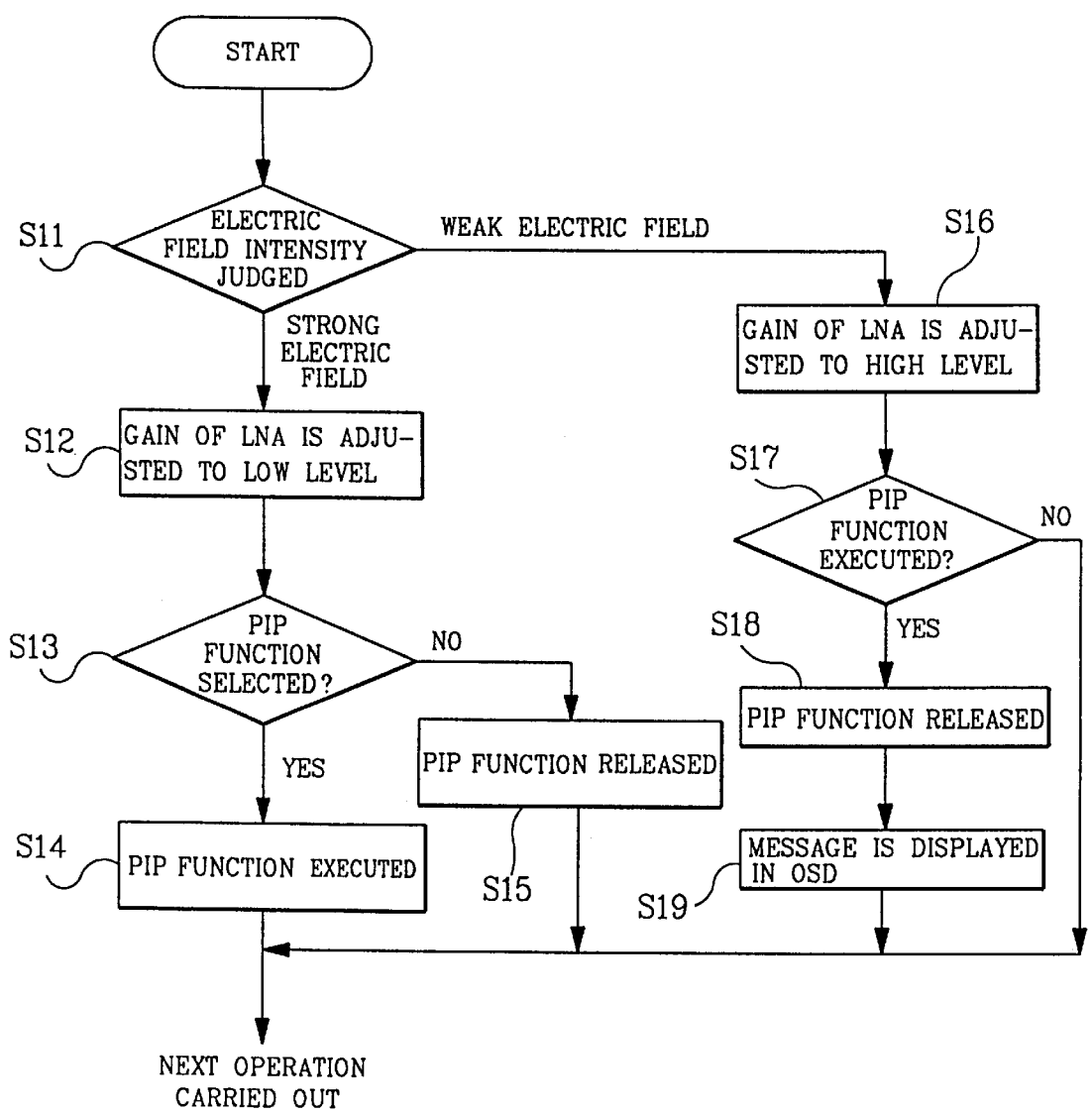
FIG. 3 is a signal flow chart showing the background noise removing method according to the present invention.

During this operation, as shown in FIG. 3, the microcomputer 10 determines on the electric field intensity of the received television broadcast signals of the tuner section 50 based on the detected electric field intensity which is inputted into the terminal IN of the microcomputer 10 at step S11.

If the electric field intensity which is determined at step S11 is strong, then at step S12, the microcomputer 10 outputs a control signal to the gain adjustment terminal GA of the LNA 30, so that the LNA 30 amplifies the received television broadcast signals with a low amplification gain.

At step S13, a determination is made as to whether the user selects the PIP function through the signals of the working command inputting section 20.

If the PIP function is selected at step S13, the microcomputer 10 executes the PIP function at step S14.

That is, the microcomputer 10 makes the PIP picture receiving section 70 receive the television broadcast signals and output PIP picture video signals. Further, the microcomputer (10) controls the PIP section 80 to insert the PIP picture video signals of the PIP picture receiving section 70 into the main picture video signals of the intermediate frequency amplifying/detecting section 52. These merged signals are then outputted through the OSD section 90 in order for the PIP picture to be inserted into and displayed in the main picture.

If the PIP function is not selected at step S13, the microcomputer 10 releases the PIP function at step S15.

If the electric field intensity of the television broadcast signals which are received by the main picture receiving section is strong, then the microcomputer 10 adjusts the amplification gain of the LNA 30 to a low level, and executes and releases the PIP function which has been selected by the user.

On the other hand if the electric field intensity is weak at step S11, the microcomputer 10 adjusts the amplification gain of the LNA 30 to a high level at step S16, and makes a determination at step S17 as to whether the PIP function is being carried out.

If the PIP function is carried out at step S17, then the microcomputer 10 releases the PIP function, and signals the OSD section 90 to display a message at step S18.

For example, the microcomputer 10 signals the OSD section 90 to display on the screen a message, e.g., "the PIP function is terminated due to weak electric field intensity signals".

Meanwhile, in the above, the descriptions were made as follows. That is, the LNA amplification gain was adjusted in accordance with the electric field intensity of the television broadcast signals which were received by the main picture receiving section. Then if the electric field intensity is weak, the PIP function was released. However, in the present invention, the execution may be done in various manners.

For example, the LNA amplification gain is not adjusted in accordance with the electric field intensity of the received television broadcast signals, but only the PIP function can be executed and released.

According to the present invention as described above, if the electric field intensity of the received television broadcast signals is weak, the PIP function is not executed.

Therefore, since the PIP picture receiving section which receives the television broadcast signals of the PIP picture does not generate the spurious radiation, the television broadcast signals of the main picture which are received by the main tuner section are not affected at all. Consequently, the background noise is reduced, so that clean pictures can be displayed.

What is claimed is:

1. A method for removing background noises during reception of weak electric field intensity signals, comprising the steps of:

determining the electric field intensity of main picture television broadcast signals received;

executing or releasing a PIP (picture in picture) function upon user selection when a strong electric field intensity is determined;

executing a main picture function irrespective of the determined electric field intensity; and releasing the PIP function only if the PIP function is being executed when a weak electric field intensity is determined.

2. The method as claimed in claim 1, further comprising the step of adjusting an amplification gain for signals received from an antenna, in accordance with the determined electric field intensity.

3. The method as claimed in claim 1, wherein the electric field intensity is determined based on AGC signals for the main picture television broadcast signals received.

4. The method as claimed in claim 1, wherein upon releasing the PIP function, a message notifying a release of the PIP function is displayed.

5. The method as claimed in claim 4, wherein the message displayed upon releasing the PIP function, is in a form of OSD.

* * * * *